No. 864,502. PATENTED AUG. 27, 1907.
G. A. BELL.
PULVERIZING MACHINE.
APPLICATION FILED SEPT. 10, 1906.
6 SHEETS—SHEET 1.
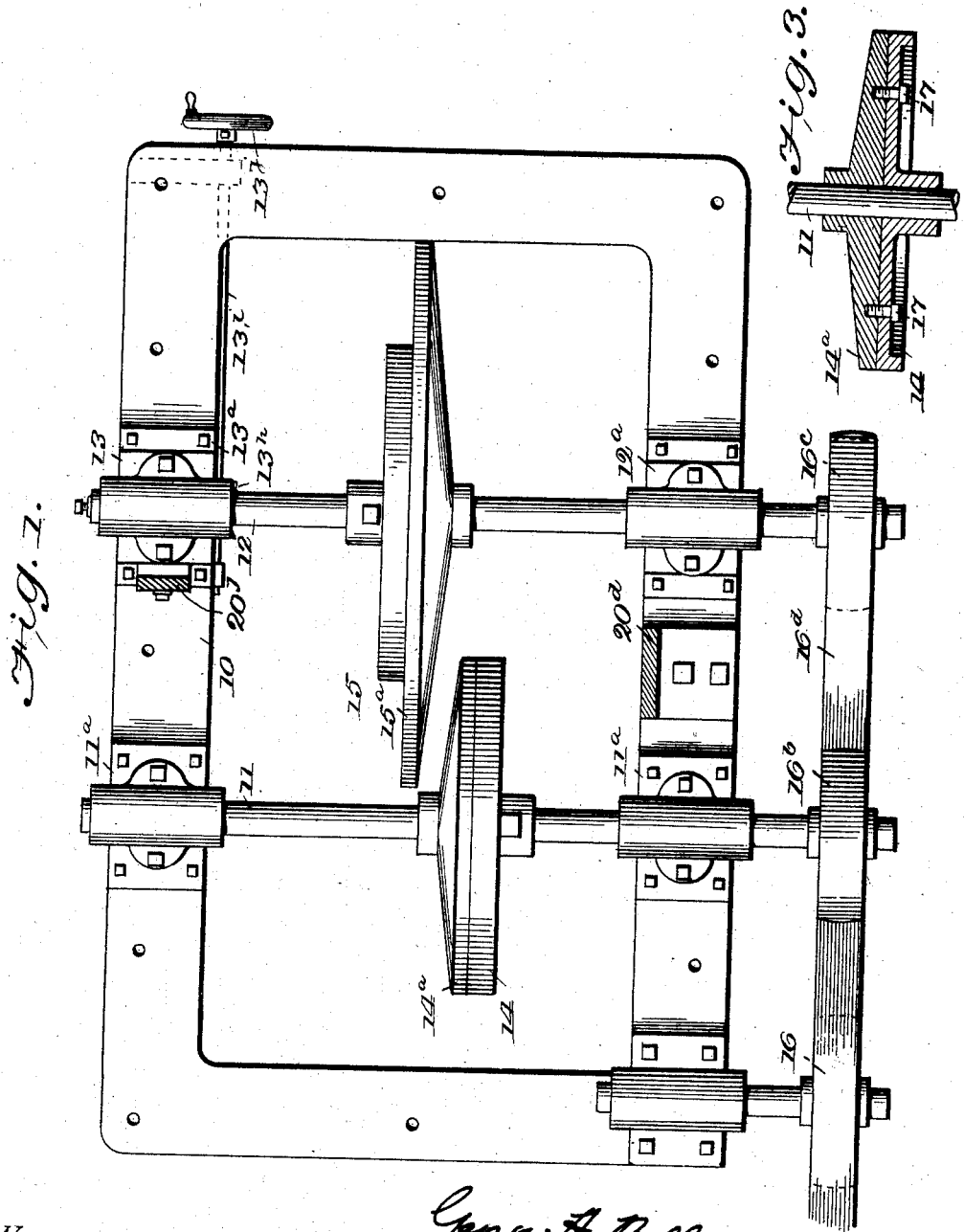
WITNESSES:
INVENTOR
George A. Bell.
BY
Attorneys

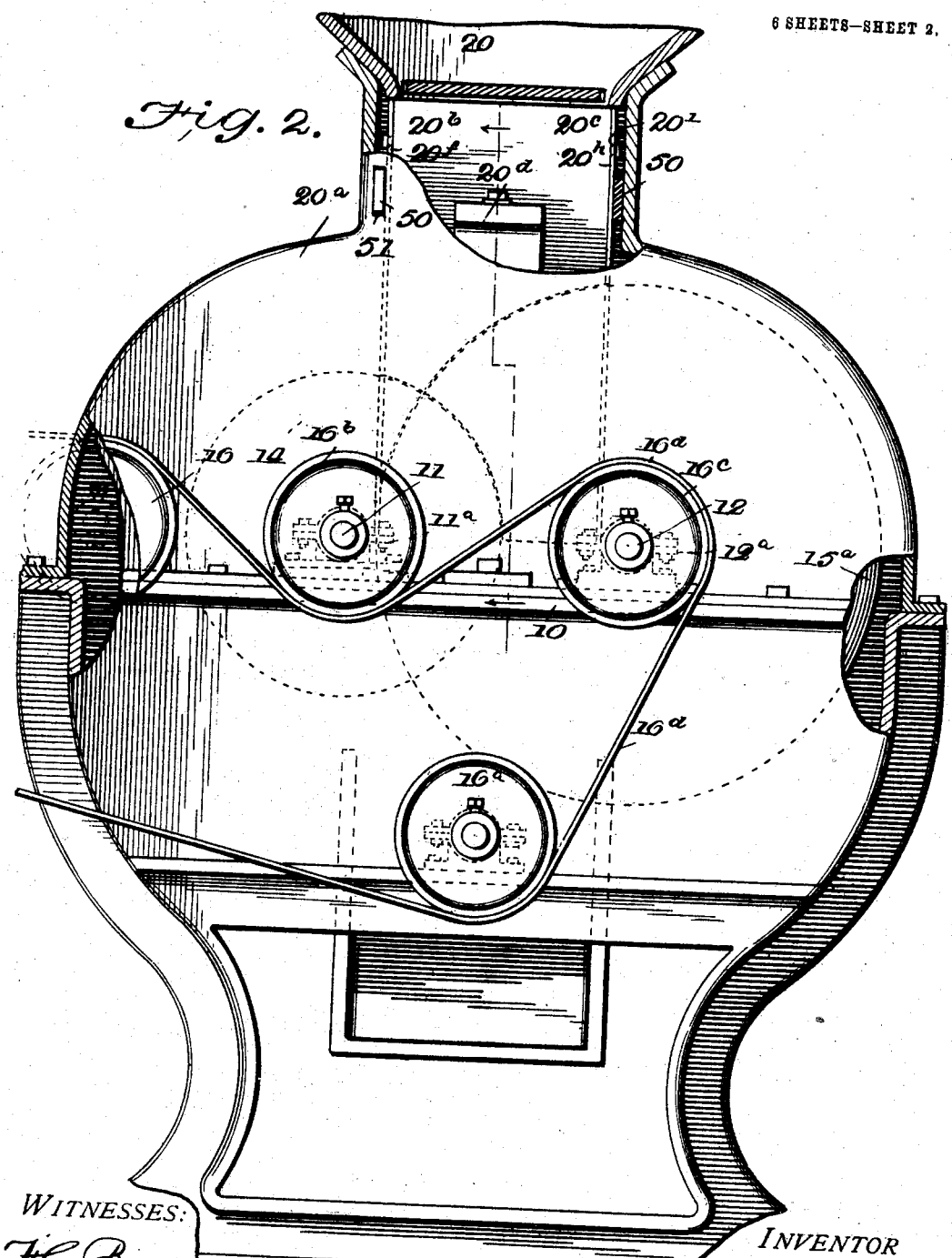

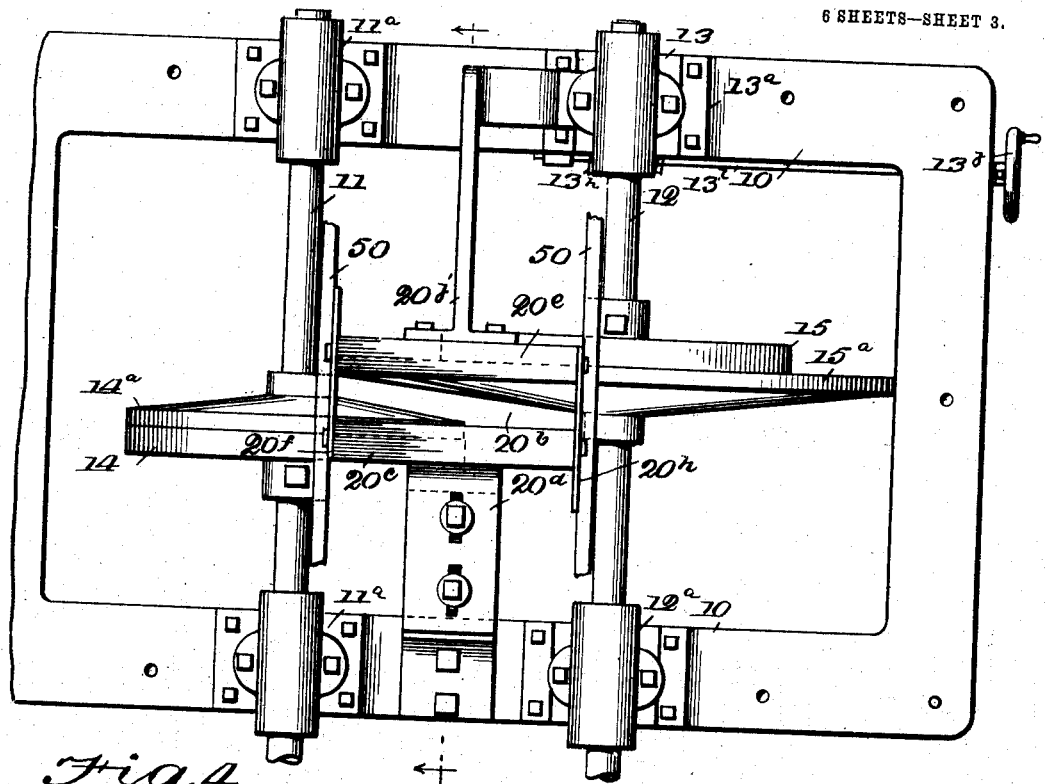

No. 864,502. PATENTED AUG. 27, 1907.
G. A. BELL.
PULVERIZING MACHINE.
APPLICATION FILED SEPT. 10, 1906.
6 SHEETS—SHEET 4.
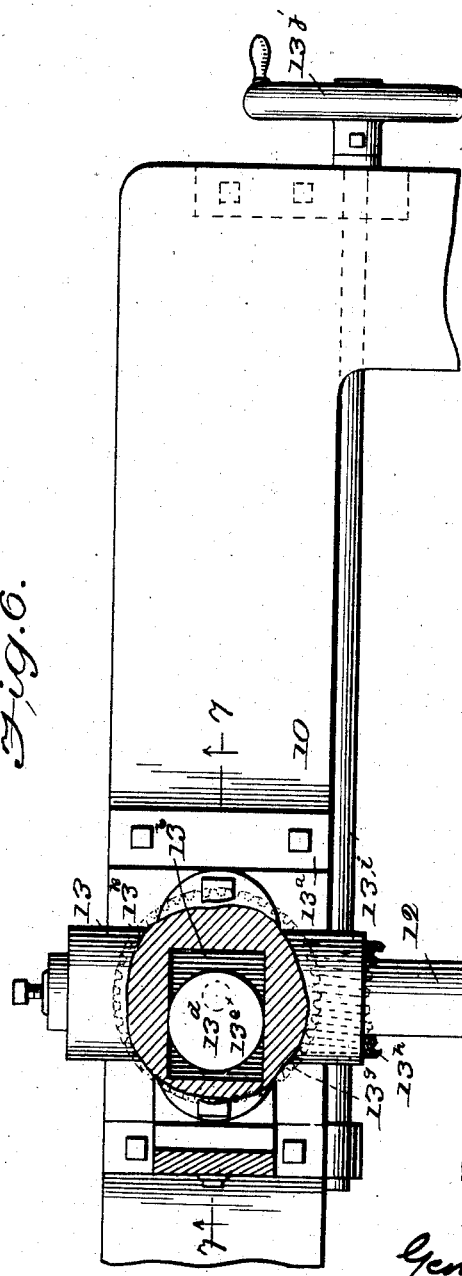
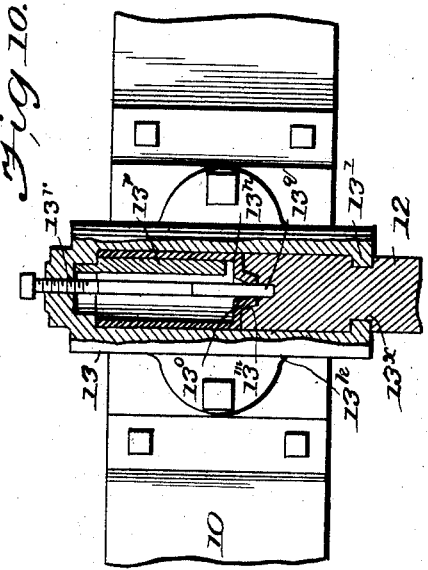
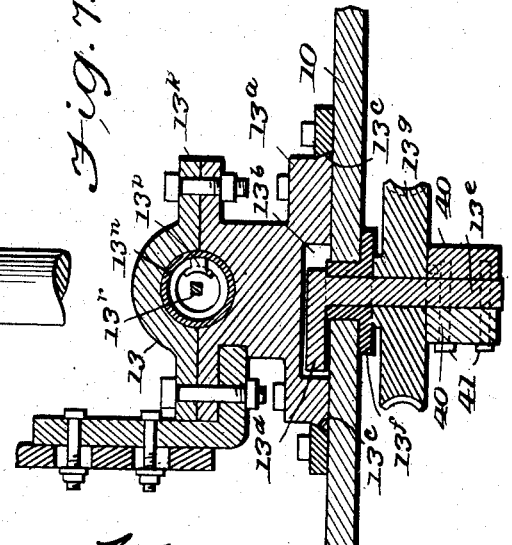
WITNESSES:
George A. Bell. INVENTOR
By _____ Attorneys No. 864,502. PATENTED AUG. 27, 1907.
G. A. BELL.
PULVERIZING MACHINE.
APPLICATION FILED SEPT. 10, 1906.
6 SHEETS—SHEET 5.
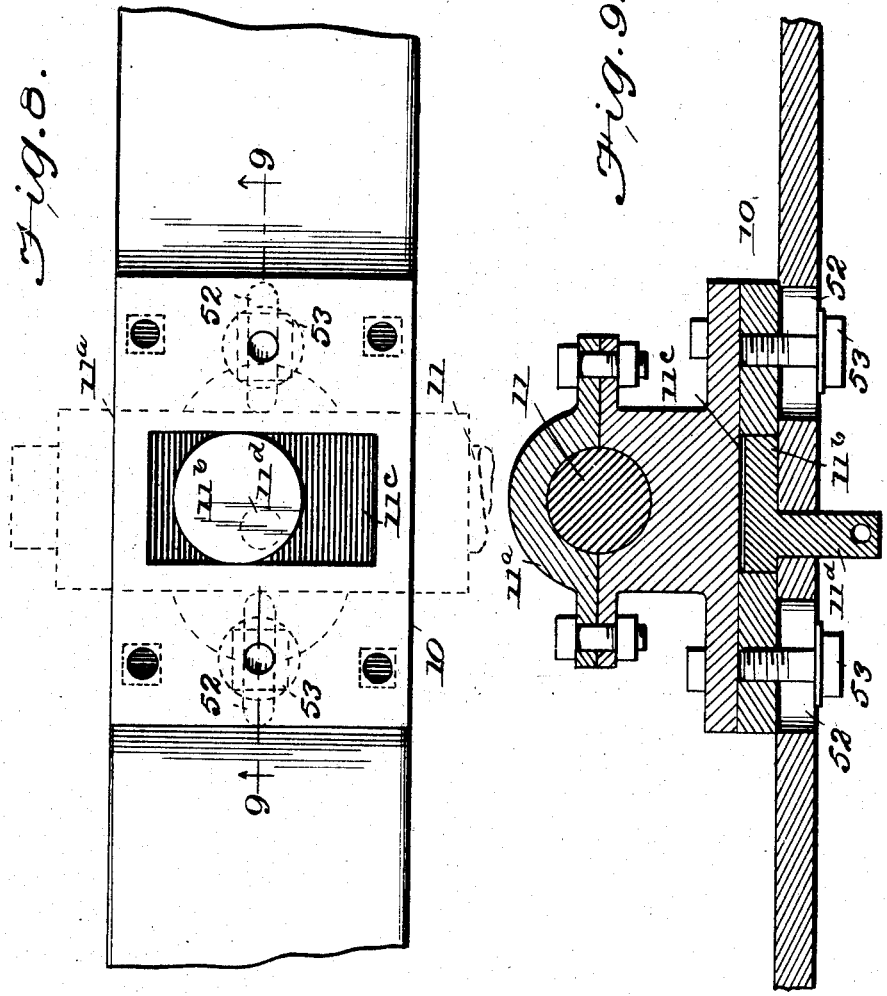
WITNESSES:
INVENTOR
George A. Bell.
By
Attorneys

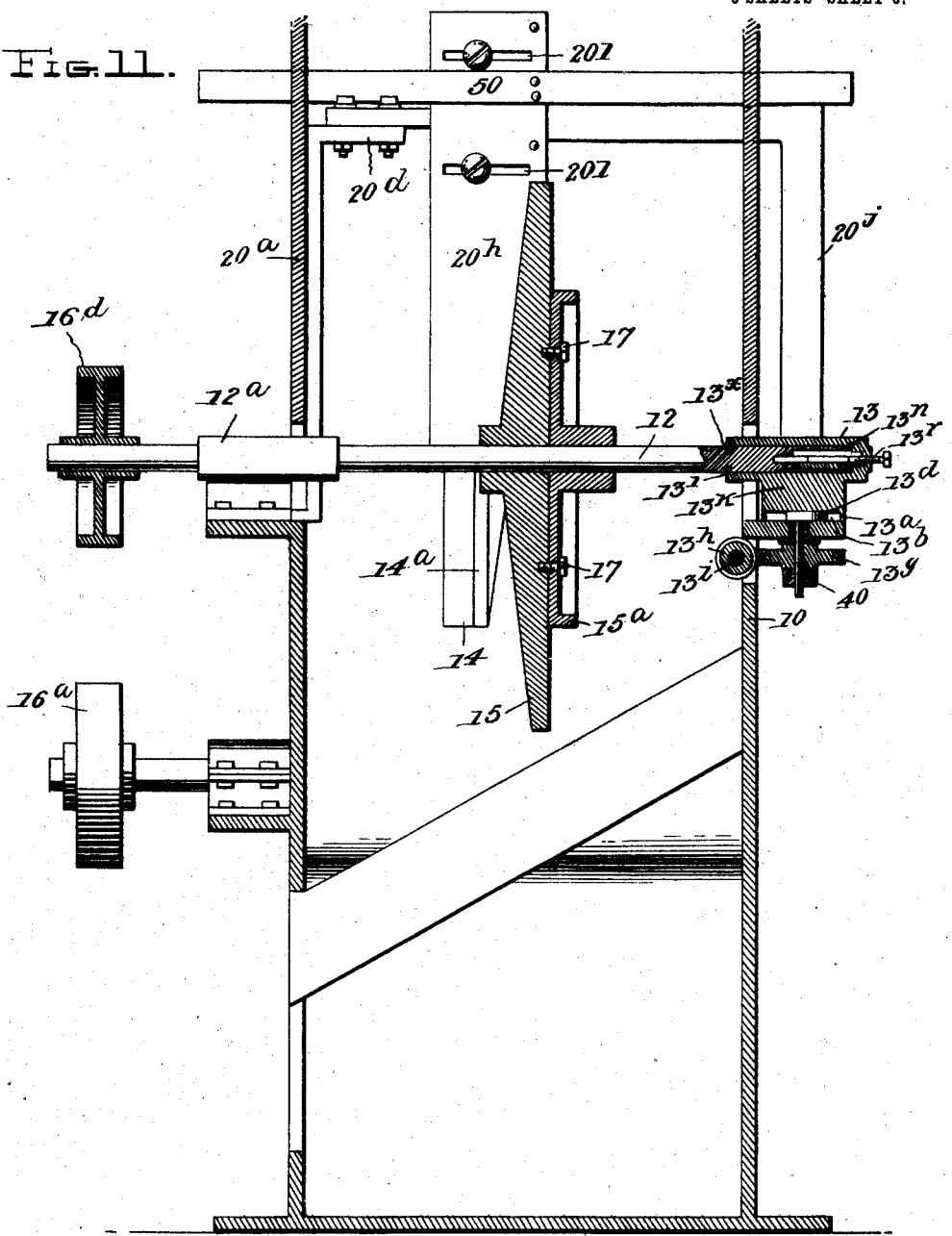

UNITED STATES PATENT OFFICE.

GEORGE A. BELL, OF AURORA, ILLINOIS, ASSIGNOR TO THE AUTOMATIC PULVERIZER COMPANY, OF OKLAHOMA TERRITORY, A COMPANY CHARTERED IN OKLAHOMA.

PULVERIZING-MACHINE.

No. 864,502.

Specification of Letters Patent.

Patented Aug. 27, 1907.

Application filed September 10, 1906. Serial No. 333,990.

*To all whom it may concern:*

Be it known that I, GEORGE A. BELL, a citizen of the United States, residing at Aurora, in the county of Kane and State of Illinois, have invented new and useful Improvements in Pulverizing-Machines, of which the following is a specification.

This invention relates to a machine which is adapted in general for pulverizing various substances. Among its uses are the crushing of stone, minerals, etc.; it is also adapted to grind cereals, clay, paints, etc.

The principal features in this invention are two conical or beveled disks of different diameter oppositely situated on different shafts. These disks have differential diameters and have means for driving their shafts preferably at a similar speed.

One feature is case hardened removable disks or grinders attached to plates mounted on the operating shafts.

Another feature is an eccentric movement for adjusting one of the shafts and its grinder longitudinally. Another is adjustable journal boxes provided with means for adjusting one of the main shafts laterally from the opposite shaft. A chute for conveying material to the grinders is also employed, and this has an automatic adjustable throat which varies according to the space between the grinders. A belt drive is preferably employed for working the machine.

In the accompanying drawings, Figure 1 is a sectional plan view of the machine, the hopper and upper part of the housing being removed. Fig. 2 is a sectional end elevation. Fig. 3 is a section of one of the grinders. Fig. 4 is a plan view showing the adjustable chute in plan. Fig. 5 is a vertical section of the chute. Fig. 6 is a sectional plan of one of the adjustable journal boxes. Fig. 7 is a section of the same on the line 7—7 of Fig. 6. Fig. 8 is a plan of the base of another journal box and means of adjustment. Fig. 9 is a section on the line 9—9 of Fig. 8. Fig. 10 is a sectional detail of one of the journal boxes. Fig. 11 is a vertical longitudinal section of the machine.

In the drawings, 10 refers to the frame and casing of the machine, in which are mounted two parallel horizontal shafts 11 and 12. The shaft 11 is mounted in journal boxes or bearings 11$^a$ on the frame, and the shaft 12 is mounted in a journal box 12$^a$ at one end, and an adjustable journal box 13 at the other end. The shaft 11 carries a rotatable plate 14 provided with a grinding disk 14$^a$. The shaft 12 has a rotatable plate 15 provided with a grinding disk or face 15$^a$ opposite the disk 14$^a$. These grinding disks are provided with means to revolve them in opposite directions. The drive is preferably a belt drive, as shown in Figs. 1 and 2, comprising a main pulley 16, an idler 16$^a$, a pulley 16$^b$ on the shaft 11, and a pulley 16$^c$ on the shaft 12, and a belt 16$^d$.

The faces or grinding disks 14$^a$ and 15 are attached by bolts or screws 17, or other means, to the main disks 14 and 15, as shown in Fig. 3. The plates 14 and 15 may be of the same size but the grinding disks have different diameters, as shown in Fig. 1. Thus the different diameters of the two disks may have a ratio of eight to ten. Again these disks may have their faces at any desirable angle, but parallel with each other. The disks may also have corrugations but are preferably smooth as shown.

A hopper 20 is supported above the grinding disks on a housing 20$^a$ which rests on the frame and incloses the grinding disks. Any suitable means for regulating the feed may be employed. Beneath this hopper is a chute 20$^b$ having an adjustable throat, one of its sides 20$^c$, being fixed on a bracket 20$^d$ attached to the frame 10, the other side 20$^e$ being adjustable. On the fixed side 20$^c$ is an end plate 20$^f$ having slots 20$^g$ through which screws extend into the plate 20$^e$, and 20$^h$ is an end plate attached to the plate 20$^e$ and having slots 20$^i$ through which screws extend into the plate 20$^c$. The plate 20$^e$ is provided with a supporting arm 20$^j$, which is mounted on the journal box 13, so that the plate 20$^e$ is adjustable therewith. The end plates 20$^f$ and 20$^h$ are beveled off at one side edge, to fit close to the faces of the disks, and so confine the material being ground. The end plates 20$^f$ and 20$^h$ of the clutch are further supported and guided by bars 50 secured thereto, the ends of said bars extending into guides 51 formed in the adjacent walls of the housing.

The device just described provides an automatic adjustable throat which varies its size or width to suit the space between the grinding disks as they are moved forward or backward. The box 13 is provided with means for moving the shaft 12 longitudinally so as to vary the space between the grinding faces of the grinders 14$^a$ and 15$^a$ and the plates or sides forming the throat. The said box 13 is mounted on a base plate 13$^a$ having a recess 13$^b$, which plate slides in a grooved guide-way 13$^c$.

13$^d$ is an eccentric in the recess 13$^b$, having a shaft 13$^e$ mounted in a bearing 13$^f$ in the frame 10. The shaft 13$^e$ is provided with a gear 13$^g$ operated by a worm 13$^h$ on a shaft 13$^i$, extending laterally to the side of the frame where a hand wheel 13$^j$ is located for turning said shaft. By turning said wheel the eccentric will move the journal box longitudinally and thus regulate the distance between the grinding disks. The eccentric shaft 13$^e$ is connected to the gear 13$^g$ by means of a friction clutch consisting of a pair of members 40 one of which is fixed to the gear and the other of which is clamped to its mate by screws 41. This will allow the disks to go apart if anything gets between the disks that cannot be crushed, such as a piece of iron or steel. The clutch will allow the eccentric $13^d$ to turn under such excessive pressure and permit the disks to go apart.

The construction of the journal box and the end of shaft 12 is preferably as follows, see Fig. 10. The base $13^a$ is provided with a box or housing $13^k$ having an annular shoulder or flange $13^l$ at its inner end, which fits in a groove $13^x$ on the shaft 12. The end of the journal of this shaft is provided with a tapered cross slot $13^m$. $13^n$ is a revoluble oil box consisting of a cylindrical shell having a toe $13^o$ which engages and is set in the slot $13^m$. $13^p$ is a scraper within the oil box for removing oil from the side of the box. $13^q$ is a central stub rod projecting from the end of the journal. $13^r$ is a screw-threaded rod extending through the outer end of the box and provided with a squared end. By tightening up this rod against the stub rod the shaft will be moved forward so as to take up any slack between the flange $13^l$ and groove $13^x$. The means described effectively sustain the end thrust of the shaft 12 and provide means for oiling the same and adjusting the same.

To adjust the shaft 11 and the grinder $14^a$ laterally from the shaft 12, I place under each journal box $11^a$ an eccentric $11^b$ which fits in a recess $11^c$ in the base of the journal box. Slots 52 and bolts 53 are provided for retaining the box on the frame.

$11^d$ is a stub shaft projecting downwardly from the eccentric through a bearing in the frame 10. Key holes are provided in the same, and by turning the said eccentric the journal box will move laterally and parallel with regard to the shaft 12.

I claim:

1. In a grinding or crushing mill, the combination with a frame, parallel shafts mounted therein and having opposite co-acting disks thereon, of means to shift one of the shafts lengthwise to vary the distance between the disks, a chute above the disks, having a side adjustable in and out to vary the size of the chute, and connections between said side and the shifting means, whereby the chute will be varied in size according to the adjustment of the disks.

2. In a grinding or crushing mill, the combination with opposite grinding devices and means to adjust the same to and from each other, of a chute adjustable in size, for supplying material thereto, and means to simultaneously adjust the grinding devices and the chute, to vary the feed according to the adjustment of the devices.

3. In a grinding or crushing mill, the combination with a frame, and parallel shafts therein having co-acting grinding disks thereon, of means to shift a shaft to vary the relation of the disks, comprising a journal box slidably mounted on the frame and in which the shaft has bearing, said box having a recess in its under side, an eccentric pivoted on the frame and located in said recess, and means to turn the eccentric.

4. In a grinding or crushing mill, the combination with a frame, and parallel shafts therein having co-acting grinding disks thereon, of a movable journal box mounted in guides and supporting a shaft on the frame, said box having a recess in its under side, an eccentric fitting in the recess, a pivot extending from the eccentric downwardly through a bearing in the frame, and an operating shaft geared to the pivot under the frame, to turn the eccentric.

5. In a grinding or crushing mill, the combination of a frame, parallel shafts therein having co-acting grinding disks thereon, of a chute between the disks, having a movable side to adjust its size, and means to shift a shaft and said movable side, comprising a journal box slidably mounted on the frame and connected to said side, and in which the shaft has bearing, and means to shift the journal box.

6. The combination with a frame, and parallel shafts therein having co-acting grinding disks thereon, of a movable journal box supporting one of the shafts on the frame, an eccentric fitting against the box and having a pivot pin provided with a gear secured thereto by a friction clutch, and an operating shaft having a worm engaging the gear.

In testimony whereof I have signed my name to this specification in the presence of two subscribing witnesses.

GEORGE A. BELL.

Witnesses:
H. B. SPENCER,
E. L. SYLVESTER.